United States Patent [19]
Stache et al.

[11] 3,879,379

[45] Apr. 22, 1975

[54] 3-AMINO-CARDENOLIDES AND PROCESS FOR THEIR MANUFACTURE

[75] Inventors: Ulrich Stache, Hofheim, Taunus; Werner Fritsch, Neuenhain, Taunus; Werner Haede, Hofheim, Taunus; Kurt Radscheit, Kelkheim, Taunus; Ernst Lindner, Frankfurt, Main, all of Germany

[73] Assignee: Farbwerke Hoechst Aktiengesellschaft vormals Meister Lucius & Bruning, Frankfurt, Germany

[22] Filed: Mar. 17, 1971

[21] Appl. No.: 125,425

[30] Foreign Application Priority Data
Mar. 19, 1970 Germany............................ 2013032

[52] U.S. Cl............................. 260/239.57; 424/241
[51] Int. Cl........................................ C07c 173/00
[58] Field of Search............................... 260/239.57

[56] References Cited
UNITED STATES PATENTS

| | | | |
|---|---|---|---|
| 3,198,792 | 8/1965 | Reerink et al. | 260/239.57 |
| 3,272,799 | 9/1966 | Holden et al. | 260/239.55 |

OTHER PUBLICATIONS

"Steroid Reaction Mechanisms," by Kirk et al. (1968), Page 343 relied on.

*Primary Examiner*—Elbert L. Roberts
*Attorney, Agent, or Firm*—Curtis, Morris & Safford

[57] ABSTRACT

Cardioactive 3-amino-cardenolides and a method for preparing them by reacting a 3-oxo-cardenolide with hydroxylamine or its salts to form a cardenolide-3-oxime and then catalytically hydrogenating this intermediate.

12 Claims, No Drawings

3-AMINO-CARDENOLIDES AND PROCESS FOR THEIR MANUFACTURE

The present invention relates to 3-amino-cardenolides and to a process for their manufacture.

Cardenolide-aglucones which carry an amino group directly linked to a carbon atom of the steroid skeleton have not yet been found in nature nor synthetized.

The present invention provides 3-amino-cardenolides of the general formula

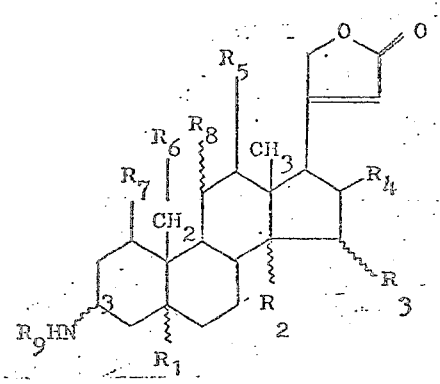

in which $R_1$ represents hydrogen or $\beta$-hydroxy, $R_2$ and $R_3$, which may be identical or different, represent hydrogen or hydroxy, or $R_2$ and $R_3$ together represent another C—C bond or an $\alpha$- or $\beta$-oxido group, $R_4$, $R_5$ and $R_6$ each represent hydrogen or a hydroxy group which may be esterified - the OH group for $R_6$ being optionally also etherified -, $R_8$ represents hydrogen or hydroxy, and $R_9$ represents hydrogen or an acyl or benzoyl radical, and salts thereof with inorganic or organic acids, in case $R_9$ represents hydrogen.

This invention furthermore provides a process for the manufacture of these compounds which comprises reacting 3-oxo-cardenolides corresponding to the above formula, in which the 3-amino group is replaced by a 3-oxo function and $R_1$ to $R_8$ have the meanings given above and, in addition, a 4(5)-double bond may be present, with hydroxylamine or salts thereof, and then catalytically hydrogenating the cardenolide3-oxime derivatives obtained with hydrogen in the presence of a metal catalyst in inert solvents and finally, optionally acylating the 3-amino-cardenolides obtained in order to obtain esterified OH-groups, or converting them into the acid addition salts thereof with organic or inorganic acids.

The fact that the oxime group in the 3-position is hydrogenated in preference to the 20(22)-double bond of the 17$\beta$-butenolide ring, i.e. that a partial hydrogenation is possible, is very surprising and could not be foreseen. Moreover, an isolated double bond or an oxido group in the 14,15-position is in most cases not hydrogenated simultaneously. Hydroxy groups in free, esterified or etherified form in the 1-, 5-, 11-, 12-, 14-15-, 16- and 19-positions are also not altered during the reaction. In contradistinction thereto, a 4,5-double bond, for example in the canarigenone-3-oxime, is also hydrogenated during catalytic hydrogenation of the 3-oxime group, whereupon the corresponding 3-amino-cardenolides saturated in the 4,5-position are obtained.

As starting substances there are mentioned, for example, the following 3-oxo-cardenolides which are generally obtainable by oxidation of the corresponding 3$\alpha$- or 3$\beta$-hydroxycardenolides according to known methods:

Digitoxigenone, uzarigenone, canarigenone, 3-dehydro-periplogenin, 3-dehydro-gitoxigenin, 3-dehydro-sarmentogenin, 3-dehydro-oleandrigenin, 3-dehydro-digoxigenin, 3-dehydro-k-strophanthidol, 3-dehydro-mallogenin, 3-dehydro-coroglaucigenin, 3-dehydro-aco-venosigenin A, 3-dehydro-adonitoxigenin, 3-oxo-5$\beta$,14$\alpha$-card-20(22)-enolide, 3-oxo-5$\alpha$,14$\alpha$-card-20(22)-enolide, 3-oxo-carda-4,20(22)-dienolide, 3-oxo-14,15$\alpha$-oxido-5$\beta$- or 5$\alpha$-card-20(22)-enolide, 3-oxo-14,15$\alpha$-oxido-5$\beta$- or 5$\alpha$-card-20(22)-enolide, 3-oxo-14,15$\alpha$- or 14,15$\beta$-oxido-carda-4,20(22)-dienolide, 3-oxo-carda-4,14,20(22)-trienolide, 3-oxo-5$\beta$- or 5$\alpha$-carda-14,20(22)-dienolide.

To convert the 3-oxo-cardenolides into their 3-oximes, hydroxylamine is used as such or in the form of its salts which may be derived, for example, from hydrochloric acid, hydrobromic acid, sulfuric acid, acetic acid or oxalic acid.

The catalytic hydrogenation of the 3-oxime group yielding the 3-amino group is carried out in the presence of metal catalysts, for example palladium, platinum, rhodium, zinc, nickel or iridium catalysts or mixtures of these catalysts, preferably palladium catalysts, for example palladium black, palladium on barium- or strontium-carbonate, or nickel catalysts, for example Raney nickel or mixed catalysts of palladium and Raney nickel.

The 3-oxo-cardenolides are converted into the 3-oximes according to generally used methods. For example, the 3-oxo-cardenolide is dissolved or suspended in an alcohol, for example methanol, excess hydroxylamine is added in the form of its salts, for example as the hydrochloride, as well as water and a weak base, for example sodium acetate, in order to neutralize the acid, and the reaction mixture is refluxed for 1 to 5 hours. After the usual working-up, the cardenolide-3-oximes obtained are isolated as crystals.

The catalytic hydrogenation is carried out according to usual methods in solvents, for example ethanol, methanol, propanol, tetrahydrofuran, dioxan, methylene chloride, chloroform, dichloroethane, benzene, toluene or mixtures of these solvents with or without addition of water. The reaction is carried out at normal pressure or at an excess pressure of up to about 50 atmospheres at temperatures of from $-20°$ to $70°C$, preferably from $0°$ to $30°C$, in apparatus usual for a catalytic hydrogenation. Care should be taken that the catalytic hydrogenation be discontinued after absorption of 2 mol-equivalents of hydrogen gas unless a double bond is present in 4(5)-position, or after absorption of 3 mol-equivalents of hydrogen gas if there is a double bond in 4(5)-position, unless the hydrogenation has come to a standstill on its own after absorption of this amount of hydrogen. By checking the ultraviolet absorption within the range from 207 to 220 m$\mu$ (= 17$\beta$-butenolide ring), the course of the hydrogenation can be controlled.

Subsequently, the catalyst is filtered off, the filtrate is concentrated and the crude products thus obtained are advantageously purified by converting them into their 3-amino-cardenolide salts by a reaction with inorganic or organic acids, for example hydrochloric acid, hydrobromic acid or hydroiodic acid, sulfuric acid, oxalic acid, acetic acid, formic acid, propionic acid, phthalic acid, picric acid or ascorbic acid, in inert solvents, for example ethers, tetrahydrofuran, dioxane, ethanol or methanol. These salts are then purified either by recrystallization from inert solvents or by other generally known purification operations and the purified 3-amino-3-desoxy-cardenolide salts thus obtained are reconverted into the free 3-amino-cardenolides by a reaction with weak inorganic bases, for example sodium bicarbonate or sodium carbonate. The free 3-amino-cardenolides are then - if necessary - recrystallized. However, the free 3-amino-cardenolides can also be converted in a conventional manner into their 3-acyl- or 3-benzoyl-amino-cardenolides, for example with acyl- or benzoyl-halides or acyl- or benzoyl-anhydrides in the presence of tertiary bases, for example pyridine, if desired with addition of inert solvents, and these may then be reconverted with basic compounds into their free 3-amino derivatives after purification. If required for pharmacological demands, the 3-amino-cardenolide salts or their 3-acyl- or 3-benzoyl-N-derivatives may not be hydrolyzed and the products of the invention may be used as such for therapeutic purposes.

The products of the invention have valuable pharmacological properties in the form of their free amine bases, salts or N-acyl or benzoyl derivatives. They have cardiotonic activities (for example a positive or negative inotropic action), the relationship of which to each other surprisingly differs from those of cardenolides oxygenated in 3-position, from which they are derived. A similar spectrum of pharmacological activities - although in a different relationship of the individual actions to each other-is also, surprisingly, shown by the cardenolide-3-oximes serving as intermediates. In this case, it must be considered surprising that high cardiotonic activities are inherent even in such products or intermediates of the invention which do not have an oxygen function in the 14-position (for example structures having a 14 - H or 14(15)-double bond), although it is known that their analogous compounds which have an oxygen function in the 3-position show no corresponding effects. Furthermore, some of the above-mentioned products of the invention or the precursors thereof exhibit interesting cardiovascular and/or adrenergic properties.

Animal tests were carried out in known manner, for example as the atrium test or the potassium excretion test on an isolated Guinea pig's heart.

The single dose for a human being may be from about 0.1 to 3 mg per unit. The new compounds may be therapeutically administered above all in their oral application form as dragees, tablets or capsules, for which the usual pharmaceutical carriers, for example, starch, lactose, tragacanth, magnesium stearate and talcum, may be used. For intravenous injections water or physiological sodium chloride solution may serve as solvents for the ampoules.

The following examples serve to illustrate the invention.

EXAMPLE I a. 2.1 g of hydroxylamine hydrochloride were added to a solution of 2 g of digitoxigenone in 200 ml of methanol and after addition of 5 g of sodium acetate in 21 ml of water the whole was refluxed for 2 hours. The solution was then concentrated in vacuo, the reaction mixture was poured onto water, the precipitated crystals were suction-filtered, washed and dried over $P_2O_5$. 1.87 g of digitoxigenone-3-oxime were obtained, m.p. 230°C (sometimes with a conversion point at 131°C). Typical infrared bands (in KBr): 3450–3350 (broad), 1775, 1730 (broad), 1620 $cm^{-1}$.

b. A solution of 1 g of digitoxigenone-3-oxime in 20 ml of ethanol was added to a preliminarily hydrogenated suspension of a Raney-nickel/palladium catalyst in 10 ml of ethanol [preparation of the mixed catalyst from 5 g of Raney nickel and 500 mg of $PdCl_2$ according to Liebig's Annalen der Chemie 721, 183 (1969)] and the mixture was hydrogenated at normal pressure and at 25°C. After absorption of 102 ml of hydrogen (theoretical consumption 115 ml) no more hydrogen is consumed. The catalyst was filtered off and the solvent was distilled off in vacuo. 845 mg of a crystallized residue were obtained which were dissolved in 4 ml of absolute tetrahydrofuran for convertion into the amine hydrochloride. The solution was then acidified with etherized hydrochloric acid to reach a pH of about 2, whereupon a crystalline precipitate separated. The solvents were then eliminated in vacuo, the residue was taken up in 70 ml of water, the solution was heated for a short time on a steam bath, the small amount of undissolved substance was separated by filtration and an aqueous sodium carbonate solution was added to the clear filtrate until a pH of about 8 to 10 was reached, whereupon a milky precipitate separated. The product was then extracted once with ether and twice with acid-free methylene chloride. After elimination of the solvent from the methylene chloride extracts, a residue was obtained which was crystallized from ether. The 3-amino-3-desoxy-digitoxigenin was obtained as a free amine, m.p. 270° – 272°C. Typical infrared bands (in KBr): 3450, 3345 (very pointed), 3280, 3220 (rounded), 1780, 1735, 1630, 1590 $cm^{-1}$. When the residue obtained after acidification with etherized hydrochloric acid and concentration was digested several times with absolute ether, crystals were obtained which were the 3-amino-3-desoxy-digitoxigenin hydrochloride. Typical infrared bands (in KBr): 3480 – 3410 (broad, gradually passing into the C-H valency range of from 2940 to 2360 $cm^{-1}$), 1775, 1730, 1615 $cm^{-1}$. Beilstein test strongly positive.

c. A solution of 2 g of canarigenone in 200 ml of methanol was reacted in the manner disclosed sub (a) with 2.1 g of hydroxylamine hydrochloride and the reaction product was worked up. 1.93 g of canarigenone-3-oxime were obtained which, after recrystallization from chloroform/ether, had a melting point of 245° – 247°C. Typical infrared bands (in KBr): 3450 and 3370 (broad), 1775, 1740 – 1725, 1620 (very intense) $cm^{-1}$.

d. A solution of 2 g of canarigenone-3-oxime in 20 ml of ethanol was catalytically hydrogenated in the manner disclosed sub (b). After absorption of 147 ml of hydrogen no more hydrogen was absorbed. After further treatment and purification over hydrochloride as disclosed sub (b) and after recrystallization from chloroform/ether the same 3-amino-3-desoxy-digitoxigenin having the same values as indicated sub (a) was obtained.

EXAMPLE 2 a. A solution of 2 g of 3-oxo-5β,14α-card-20(22)-enolide in 200 ml of methanol was reacted in the manner disclosed in Example 1 sub (a) with 2.1 g of hydroxylamine hydrochloride and the reaction product was worked up. 2.04 g of 3-oxime of the 3-oxo-5β,14α-card-20(22)-enolide were obtained. Typical infrared bands (in KBr): 3380 – 3300 (broad), 1775, 1740, 1620 cm$^{-1}$.

b. A solution of 1 g of the oxime of 3-oxo-5β,14α-card-20(22)-enolide in 40 ml of ethanol was catalytically hydrogenated as disclosed in Example 1 sub (b). After absorption of approximately 2 mol-equivalents of hydrogen no more hydrogen was absorbed. After an analogous further treatment and purification over hydrochloride as disclosed in Example 1 sub (b) and after recrystallization from ether the 3-amino-5β,14α-card-20(22)-enolide was obtained, m.p. 230° –239°C (wide sintering range!). Typical infrared bands (in KBr): 3355, 3295, 1780, 1750, 1625, 1590 cm$^{-1}$.

EXAMPLE 3:

a. A solution of 1 g of uzarigenone in 100 ml of methanol was reacted in the manner disclosed in Example 1 (a) with 1.05 g of hydroxylamine hydrochloride and 2.5 ml of sodium acetate in 10.5 ml of water and the reaction product was worked up. 875 mg of uzarigenone-3-oxime were obtained, m.p. 241° – 246°C. Typical infrared bands (in KBr): 3470 – 3350 (broad), 1780, 1730 – 1735, 1625 cm$^{-1}$.

b. A solution of 500 mg of uzarigenone-3-oxime in 20 ml of ethanol was catalytically hydrogenated in the manner disclosed in Example 1 (b), though using half the amount of catalyst. After absorption of about 53 ml of hydrogen, hydrogenation came to a standstill. After analogous further treatment and purification over hydrochloride as disclosed in Example 1 (b) and after recrystallization from chloroform/ether the 3-amino-3-desoxy-uzarigenine was obtained, m.p. 281° – 284°C (sintering). Typical infrared bands (in KBr): 3480, 3340, 3280, 3225, 1780, 1740, 1630, 1590 cm$^{-1}$.

EXAMPLE 4 a. A solution of 2 g of 3-oxo-5β-carda-14,20(22)-dienolide in 200 ml of methanol was reacted as disclosed in Example 1 (a) with 2.1 g of hydroxylamine hydrochloride and the reaction product was worked up. 1.84 g of the oxime of 3-oxo-5β-carda-14,20(22)-dienolide were obtained. Typical infrared bands (in KBr): 3375–3300 (broad), 1775, 1740 – 1735, 1620 cm$^{-1}$.

b. A solution of 1 g of the oxime of 3-oxo-5β-carda-14,20-(22)-dienolide in 40 ml of ethanol was catalytically hydrogenated as disclosed in Example 1 (b). After absorption of approximately 2 mol-equivalents of hydrogen, hydrogenation came to a standstill. After analogous further treatment and purification over hydrochloride as disclosed in Example 1 (b), and after digesting with ether, the 3-amino-5β-carda-14,20(22)-dienolide was obtained, m.p. 174°–178°C (sintering). Typical infrared bands (in KBr): 3350, 3290, 1775, 1745, 1625, 1590 cm$^{-1}$.

EXAMPLE 5

0.1 ml of acetic anhydride was added to a solution of 30 mg of 3-amino-3-desoxy-digitoxigenen in 1 ml of absolute pyridine and the mixture was allowed to stand for 18 hours at 25°C. The reaction mixture was then poured on 30 ml of water and 1 ml of aqueous 2N ammonia solution and extracted several times with ethyl acetate. The extracts were washed with water and the ethyl acetate was distilled off in vacuo. The remaining foam was crystallized by digesting it with ether. The 3-acetylamino-3-desoxy-digitoxigenin was obtained, m.p. 162° – 165°C.

Typical infrared bands (in KBr): 3440, 3370, 3075, 1775, 1735, 1655-1645 (over a broad area), 1540, 1530 cm$^{-1}$.

What we claim is:

1. A 3-amino-cardenolide of the formula

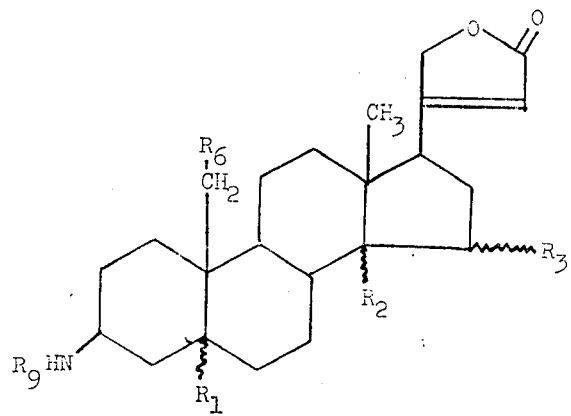

wherein $R_1$ is hydrogen or β-hydroxy; $R_2$, taken alone, is hydrogen or hydroxy; $R_3$, taken alone, is hydrogen; $R_2$ and $R_3$, taken together, represent a C—C bond; $R_6$ is hydrogen or hydroxy; and $R_9$ is hydrogen, alkanoyl, or benzoyl.

2. 3-Amino-3-desoxy-digitoxigenin.
3. 3-Amino-5β,14α-card-20(22)-enolide.
4. 3-Amino-3-desoxy-uzarigenin.
5. 3-Amino-5β-carda-14,20(22)-dienolide.
6. 3-acetylamino-3-desoxy-digitoxigenin.
7. An acid addition salt of a 3-amino-cardenolide as in claim 1 wherein $R_9$ is a hydrogen.
8. A compound of the formula

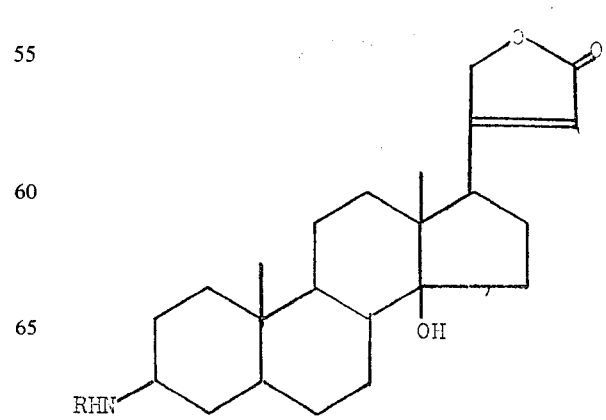

wherein R is selected from the group consisting of H and acetyl.

9. The method of making a 3-amino-cardenolide of the formula

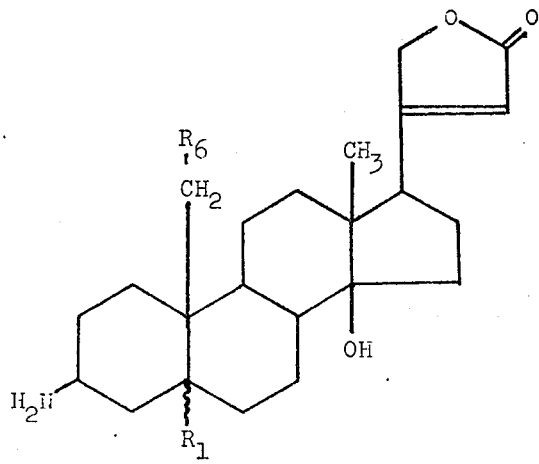

wherein $R_6$ is hydrogen or hydroxy and $R_1$ is hydrogen when $R_6$ is hydrogen or is β-hydroxy when $R_6$ is hydroxy, which comprises reducing a compound of the formula

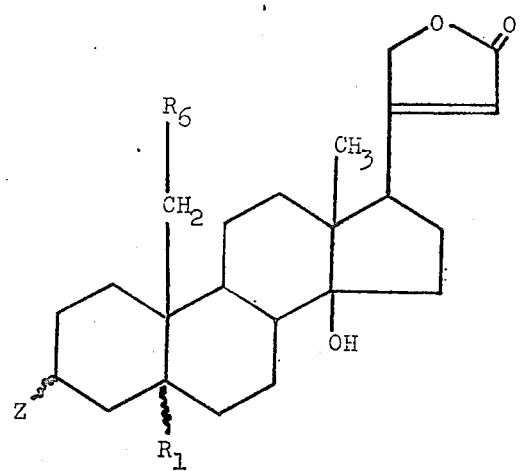

wherein Z is an hydroxyimino group and $R_1$ and $R_6$ have their earlier meanings, with hydrogen in a solvent selected from the group consisting of aqueous ethanol and mixtures of dioxan, ethanol, and water, in the presence of a palladium catalyst.

10. The method as in claim 9 wherein said 3-amino-cardenolide is reacted with an acyl halide or acyl anhydride to form the corresponding 3-acylamino-cardenolide.

11. The method as in claim 9 wherein said 3-amino-cardenolide is salified with an organic or inorganic base.

12. A compound of the formula

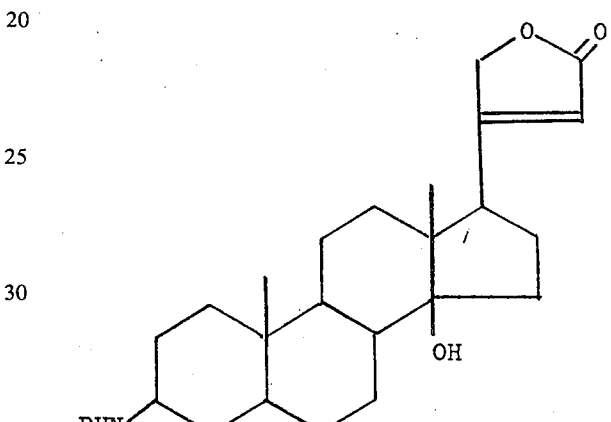

wherein R is selected from the group consisting of H and acetyl
and acid addition salts thereof.

* * * * *